F. C. KRAUSE.
Gas Stove.
No. 21,076.
Patented Aug. 3, 1858.
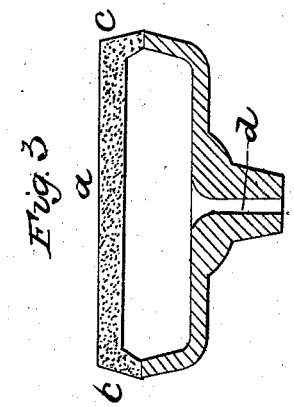
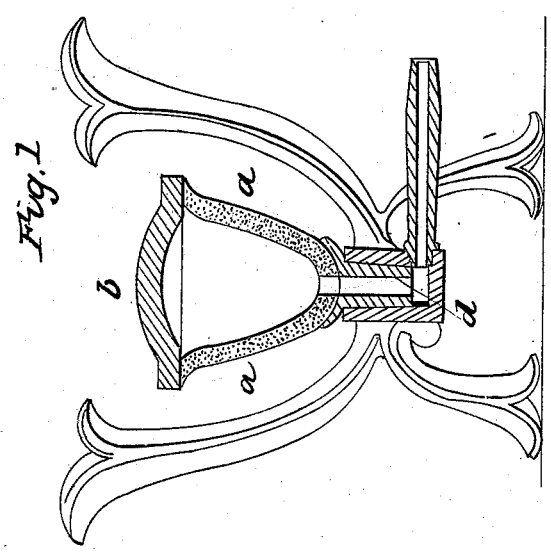
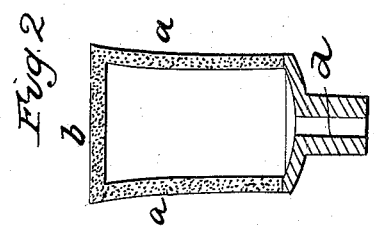

UNITED STATES PATENT OFFICE.

F. C. KRAUSE, OF NEW YORK, N. Y.

GAS-BURNER.

Specification of Letters Patent No. 21,076, dated August 3, 1858.

*To all whom it may concern:*

Be it known that I, FREDERICK CHARLS KRAUSE, of the city, county, and State of New York, have invented a new and useful Improvement in Gas-Burners for Heating Purposes; and I do hereby declare that the following is a full, clear, and exact description of the same, reference being had to the accompanying drawings, making part of this specification, in which—

Figure 1 is a central section of a burner constructed according to my invention and of a stand which supports it in a stove. Figs. 2 and 3 are modifications of the burner without the stand.

The improvement consists in the manufacture of gas-burners for heating purposes, or those parts of them from which the gas is to be emitted, of a composition made by mixing pulverized burnt fire-clay with powdered glass, carbonate of soda, or some other flux or substance of similar character, that is to say, which may be baked with the fire-clay at a low red or white heat, and by its fusion at such heat, will serve to unite the particles of fire-clay but yet make with it a composition of a very porous character, which is sufficiently refractory to enable the gas to be burnt on its surface, and to bear the repeated heating and cooling to which a gas-burner is subject.

To make the composition for the burners, the fireclay requires to be first burnt as for firebricks; and to save trouble I generally take for the purpose the best Stourbridge fire-brick. The burnt fireclay is then ground to about the fineness of coarse sand, and when ground, is mixed with finely powdered glass or carbonate of soda, in the proportion of from one to one and a half parts (by measure) of glass to six parts of the fireclay, or one part of carbonate of soda to eight parts of fire-clay. I prefer however to use the glass in all cases. To this mixture as little gum water is added as is necessary to make the mass sufficiently cohesive to enable it to be molded in proper molds into the required forms for the burners, which may be various, for instance, the burner shown in Fig. 1 has its sides only made of the porous composition; that shown in Fig. 2, the sides *a, a,* and top *b;* and that shown in Fig. 3, its top *b,* and the upper part *c, c,* of the sides; but the burner in all cases contains a chamber within it for the expansion and heating of the gas before its emission. The burners or portions thereof made of the porous material, after being molded, are baked in a pottery or other kiln or suitable oven in which they are heated so gradually that they will be about seven (7) or eight (8) hours arriving at a white heat and are kept at that heat for about half ($\frac{1}{2}$) an hour, after which they are allowed to cool. The flux or fusible matter, when fused, runs over the particles of fireclay and shrinks in such a manner as to leave innumerable fine pores between them for the issue of the gas, but yet causes the cohesion of said particles and makes a porous material having considerable tenacity.

The sockets *d, d,* of the burners, or other parts which are not required to be porous, indicated by a red tint in the drawing, are made of fireclay, and the porous portions united to them by a cement composed of either of the fluxes or fusible materials above specified, mixed with finely pulverized fireclay, but with a greater proportion of the flux or fusible material than is used in the porous composition. I generally use for this purpose equal quantities (by measure) of the pulverized fire clay and glass. The cementing together of the parts may be effected by the first baking above mentioned or by a subsequent similar baking.

The great advantage of burners constructed of this porous composition is their extreme durability; as though, when in use, the porous composition becomes heated to a red heat, it is not thereby injured; and I will mention that in my experiments I have used such burners for two years continually, without their having in any degree deteriorated.

I do not claim to be the first inventor of a porous gas-burner, as I am aware that they have been constructed of wire gauze and by making beds of such material covered with broken pumice stone and of some other substances, but

What I claim as my invention, and desire to secure by Letters Patent, is:—

The manufacture of gas-burners, or those parts of them from which the gas is to be emitted, of the porous composition produced by the union of the substances specified, in the manner set forth.

FRED. CHARLS KRAUSE.

Witnesses:
W. TUSCH,
W. HAUFF.